US012601604B2

(12) United States Patent
Kishita et al.

(10) Patent No.: US 12,601,604 B2
(45) Date of Patent: Apr. 14, 2026

(54) ENERGY PREDICTION DEVICE

(71) Applicant: DENSO CORPORATION, Kariya-city (JP)

(72) Inventors: Yuki Kishita, Kariya-city (JP); Hiroyuki Nanjo, Kariya-city (JP); Noriaki Ikemoto, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 18/651,257

(22) Filed: Apr. 30, 2024

(65) Prior Publication Data

US 2024/0377210 A1 Nov. 14, 2024

(30) Foreign Application Priority Data

May 11, 2023 (JP) ................................. 2023-078311

(51) Int. Cl.
*G01C 21/34* (2006.01)

(52) U.S. Cl.
CPC ..... *G01C 21/3469* (2013.01); *G01C 21/3446* (2013.01); *G01C 21/3461* (2013.01); *G01C 21/3484* (2013.01); *G01C 21/3492* (2013.01)

(58) Field of Classification Search
CPC ............ G01C 21/3469; G01C 21/3446; G01C 21/3461; G01C 21/3492; G01C 21/3453; G01C 21/3484
See application file for complete search history.

(56) References Cited

U.S. PATENT DOCUMENTS

2020/0050954 A1 2/2020 Fukushima et al.
2021/0063181 A1* 3/2021 Saleh ................. G01C 21/3492

* cited by examiner

*Primary Examiner* — Jacob M Amick
(74) *Attorney, Agent, or Firm* — OLIFF PLC.

(57) ABSTRACT

An energy prediction device includes a route setting unit configured to divide a travel route traveled by a vehicle and set route sections into which the travel route is divided and a model construction unit configured to construct a consumption prediction model for predicting an energy consumed by the vehicle for each route section.

11 Claims, 10 Drawing Sheets

ROUTE
SECTION 1

ROUTE SECTION 2

FIG.5

|  | ROUTE SECTION 1 | ROUTE SECTION 2 | ROUTE SECTION 3 | ROUTE SECTION 4 | ROUTE SECTION 5 |
|---|---|---|---|---|---|
| RUN 1 | 3.3 | 5.0 | 4.2 | 3.1 | 4.1 |
| RUN 2 | 2.3 | 3.8 | 4.8 | 3.9 | 5.0 |
| RUN 3 | 1.3 | 3.3 | 2.3 | 1.1 | 3.3 |

FIG.6

| | ROUTE SECTION 1 | ROUTE SECTION 2 | ROUTE SECTION 3 | ROUTE SECTION 4 | ROUTE SECTION 5 | |
|---|---|---|---|---|---|---|
| NUMBER OF STOPS | 3.3 | 5.0 | 4.2 | 3.1 | 4.1 | |
| AVERAGE VEHICLE SPEED | 23 | 38 | 48 | 39 | 50 | |
| AVERAGE ROAD GRADE | 5.1 | 0.5 | 2.3 | −1.1 | 0.3 | |

VEHICLE
SPEED

DISTANCE

ENERGY PREDICTION DEVICE

CROSS-REFERENCE TO RELATED APPLICATION

The present application is based on and claims the benefit of priority from Japanese Patent Application No. 2023-078311 filed in May 11, 2023, all the disclosure of which is incorporated herein by reference.

BACKGROUND

Technical Field

This disclosure relates to an energy prediction device.

Related Art

A technology is known for predicting an amount of energy required for a vehicle to travel an arbitrary route. According to this known technology, travel data including a plurality of features of a moving object is acquired based on information about a travelling state of the moving object. A predictor calculates a predicted amount of energy consumed of the moving object based on a first classification rule and the travel data, where the first classification rule associates a plurality of first conditions for at least one of the plurality of features with a plurality of first prediction models for the energy consumed.

BRIEF DESCRIPTION OF THE DRAWINGS

In the accompanying drawings:

FIG. 5 is an illustration of setting route sections;

FIG. 6 is an illustration of setting route sections;

DESCRIPTION OF SPECIFIC EMBODIMENTS

Figure 1:
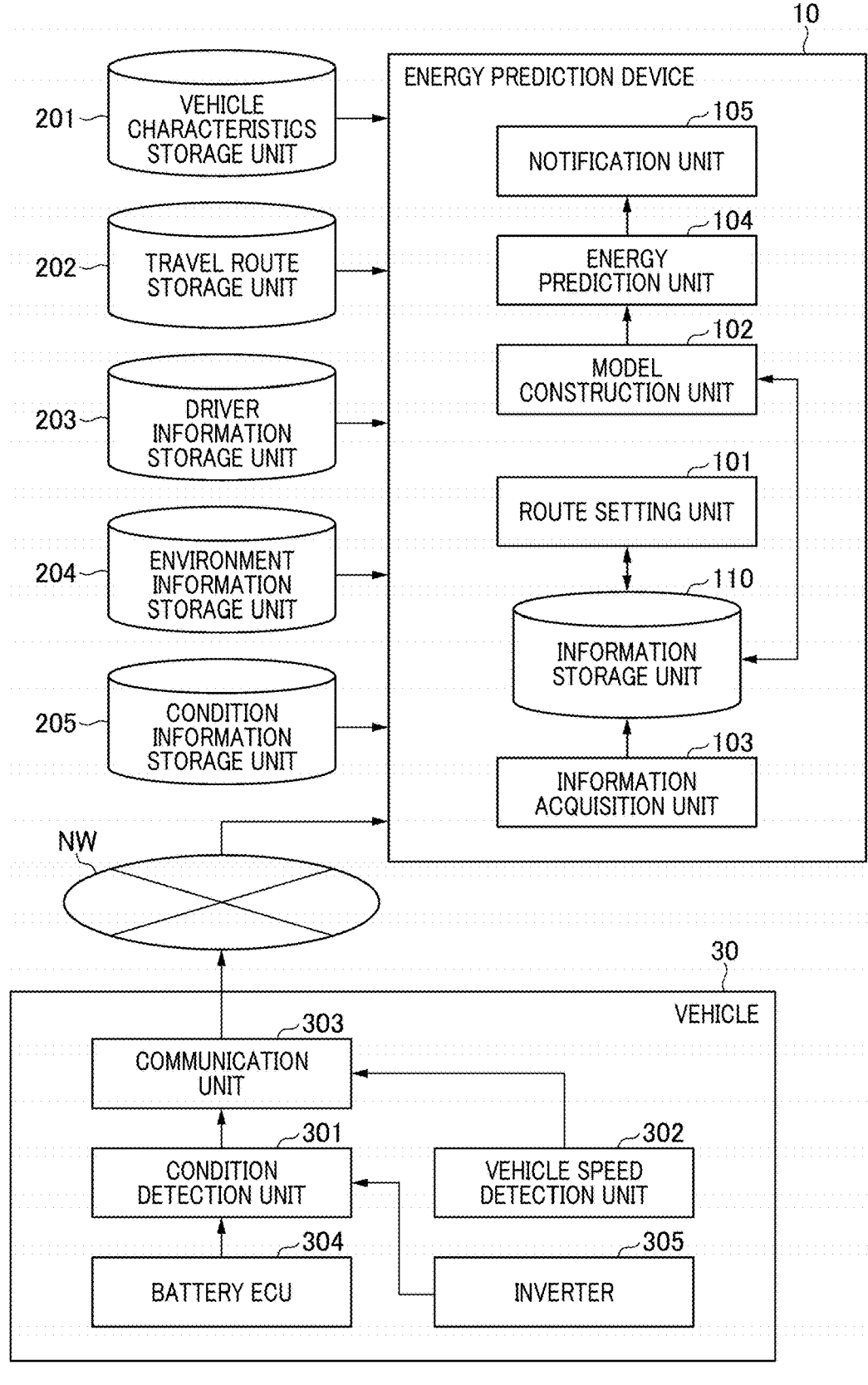
FIG. 1 is a block diagram of an energy prediction device according to one embodiment.

Various traffic conditions may be mixed on a route to be traveled, and variations in traffic conditions have different effects on the energy consumed. For example, some routes and route sections are more congested in rainy weather due to increased traffic, while other routes and route sections have little variations in traffic even in rainy weather. Since the above-known technology as disclosed in JP2020-27432A uses a single prediction model to predict an amount of energy consumed for the entire route, it is difficult to improve the prediction accuracy for routes having a mixture of various traffic conditions.

In view of the foregoing, it is desired to have an energy prediction device capable of improving the prediction accuracy of the energy consumed by a vehicle even on a travel route having a mixture of various traffic conditions.

One aspect of the present disclosure provides an energy prediction device including a route setting unit configured to divide a travel route traveled by a vehicle and sets route sections into which the travel route is divided, and a model construction unit configured to construct a consumption prediction model for predicting an energy consumed by the vehicle for each route section.

The energy prediction device configured as above is capable of improving the prediction accuracy of the energy consumed by a vehicle even on a travel route having a mixture of various traffic conditions.

Hereinafter, an exemplary embodiment will be described with reference to the accompanying drawings. In order to facilitate understanding of the description, the same structural or functional elements in the drawings share the same reference signs wherever possible, and overlapping description is omitted.

With reference to FIG. 1, an energy prediction device 10 according to the present embodiment will now be described. The energy prediction device 10 may be configured to provide information to, and/or receive information from a vehicle 30 via a network NW. The energy prediction device 10 may be configured to provide information to, and/or receive information from a vehicle characteristics storage unit 201, a travel route storage unit 202, a driver information storage unit 203, an environment information storage unit 204, and a condition information storage unit 205.

The energy prediction device 10 is configured as a computer including a central processing unit (CPU), a storage unit, such as a random-access memory (RAM), a read-only memory (ROM) and the like, and an interface unit for transmitting and receiving data.

The energy prediction device 10 includes a route setting unit 101, a model construction unit 102, an information acquisition unit 103, an energy prediction unit 104, a notification unit 105, and an information storage unit 110.

The route setting unit 101 is configured to divide a travel route of the vehicle and sets route sections into which the travel route is divided. Details of setting the route sections will be described later.

The model construction unit 102 is configured to construct a consumption prediction model for predicting an energy consumed by the vehicle for each route section. Construction of the consumption prediction model will be described in detail later.

The information acquisition unit 103 is configured to acquire condition information about energy consumption when the vehicle travels the travel route. The condition information will be described in detail later.

The energy prediction unit 104 is configured to predict the energy consumed on the travel route by predicting the energy consumed for each route section using the consumption prediction model constructed for each route section. Alternatively, the energy prediction unit 104 may be configured to predict the energy consumed on the travel route by generating a vehicle speed pattern for each route section based on a metric for each vehicle speed pattern and predicting the energy consumed based on the vehicle speed pattern for each route section. How to predict the energy consumed will be described in detail later.

The notification unit 105 is configured to notify a predefined notification destination of the energy consumed as predicted by the energy prediction unit 104. The predefined notification destination may be set arbitrarily and may be notified to the vehicle 30 or to any other notification destination.

The information storage unit 110 is configured to store the route sections set by the route setting unit 101. The information storage unit 110 is configured to store the consumption prediction models constructed by the model construction unit 102. The information storage unit 110 is configured to store the condition information acquired by the information acquisition unit 103.

The vehicle characteristics storage unit 201 is configured to store characteristics information of vehicles in general, including the vehicle 30. The characteristics information includes all pieces of information necessary to predict the energy consumed by the vehicles.

The travel route storage unit 202 is configured to store route information about travel routes traveled or scheduled to be traveled by vehicles in general, including the vehicle 30. The route information is information about travel routes and includes at least one of location information for each point, information about road grades, information about road widths, information about speed limits, information about curvatures of curves, information about locations of traffic lights or signs, information about locations of bus stops, and information about locations of intersections.

The driver information storage unit 203 is configured to store driver information about drivers who drive vehicles in general, including the vehicle 30. The driver information includes information indicating attributes of drivers and characteristics of drivers corresponding to their attributes.

The environment information storage unit 204 is configured to store environment information about environments in which vehicles in general, including the vehicle 30, are traveling or are scheduled to travel. The environment information includes at least one of weather information and date-and-time information. The weather information includes at least one of a precipitation probability and a precipitation amount. The date-and-time information includes at least one of the time of day, the day of the week, national holidays, and the season.

The condition information storage unit 205 is configured to store condition information about the energy consumed when vehicles travel the travel route. The condition information includes at least one of driving condition information, energy condition information, and road condition information. The driving condition information is information for identifying a pattern in which vehicles travel the travel route. For example, the driving condition information includes information indicating at least one of the frequency of stops, maximum speed, steady-state vehicle speed, average speed, acceleration, and deceleration.

The energy condition information is information for identifying energy required for vehicles to travel the travel route. For example, the energy condition information includes information indicating at least one of the fuel efficiency, electricity efficiency (or electrical power usage efficiency), state of charge (SOC), and inverter power.

The road condition information is information for identifying a road condition, that is, a condition of the travel route that affects energy required for vehicles to travel the travel route. For example, the road condition information includes information indicating at least one of information about road grades, information about locations of bus stops, information about locations of intersections, information about road widths, information about speed limits, information about locations of traffic lights or signs, information about curvatures of curves, and information about congestion levels.

The vehicle 30 whose energy consumption is to be predicted by the energy prediction device 10 is connected to the network NW, and travel data of the vehicle 30 is transmitted to the energy prediction device 10 via the network NW and stored in the information storage unit 110.

The vehicle 30 includes a condition detection unit 301, a vehicle speed detection unit 302, a communication unit 303, a battery ECU 304, and an inverter 305. The condition detection unit 301 acquires from the battery ECU the state-of-charge SOC of the battery used to drive the vehicle 30. The condition detection unit 301 acquires an electrical current value from the inverter 305. The state-of-charge SOC and the electrical current value are transmitted by the communication unit 303 to the energy prediction device 10. The condition detection unit 301 also detects location information of the vehicle 30. The location information is transmitted by the communication unit 303 to the energy prediction device 10. The vehicle speed detection unit 302 detects a vehicle speed of the vehicle 30. The vehicle speed is transmitted by the communication unit 303 to the energy prediction device 10. In the present embodiment, the vehicle 30 is an electric vehicle. However, the power source of the vehicle whose energy consumption is to be predicted by the energy prediction device 10 is not limited to the electric motor with the battery as a power generation source. Alternative power sources may include known gasoline engines, diesel engines, hybrid power sources combining an electric motor and an internal combustion engine, and electric motors that use fuel cells as a power generation source.

Figure 2:
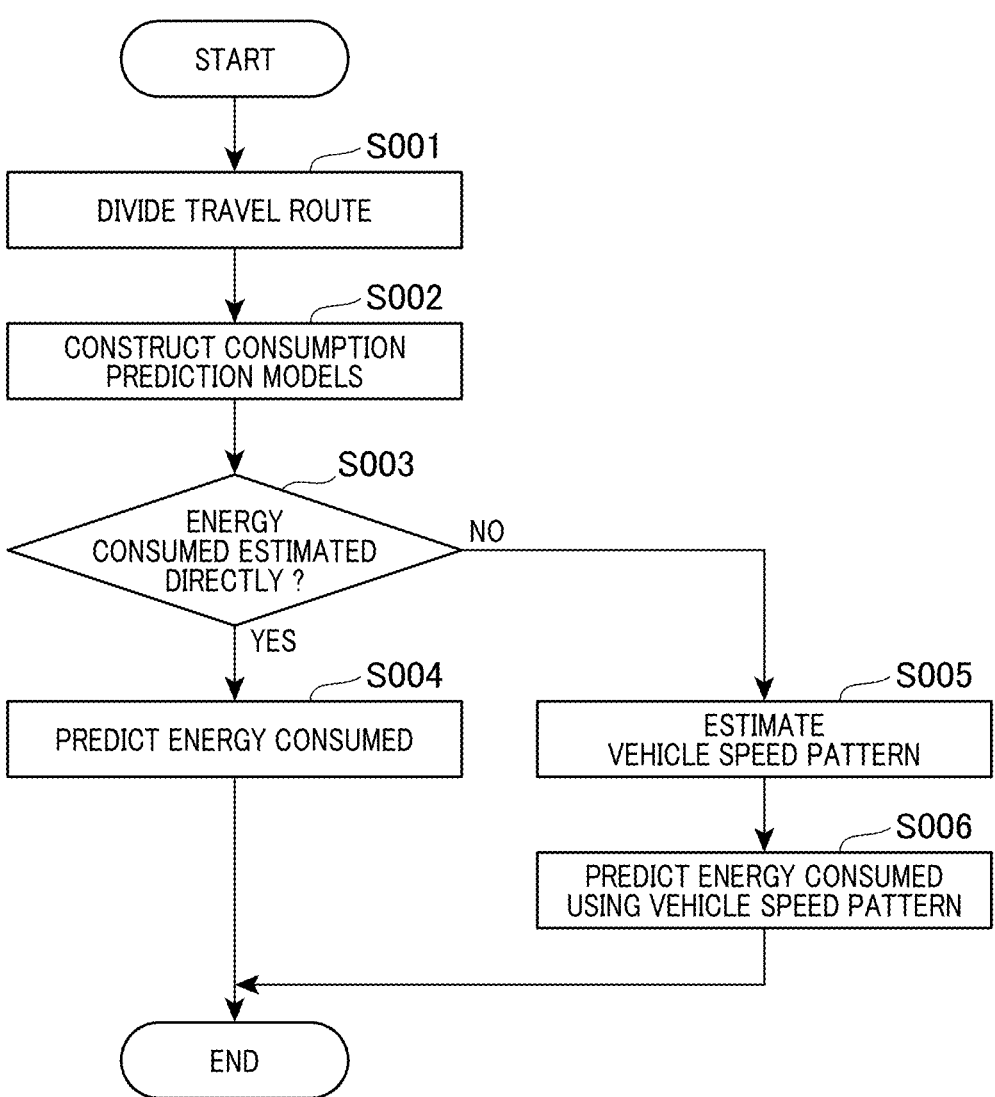
FIG. 2 is a flowchart of an information processing flow performed by the energy prediction device illustrated in FIG. 1.

An information processing flow to be performed by the energy prediction device 10 will now be described with reference to FIG. 2. At step S001, the route setting unit 101 performs a process of dividing the travel route. The process of dividing the travel route will now be described with reference to FIGS. 3A-3C.

Figure 3:
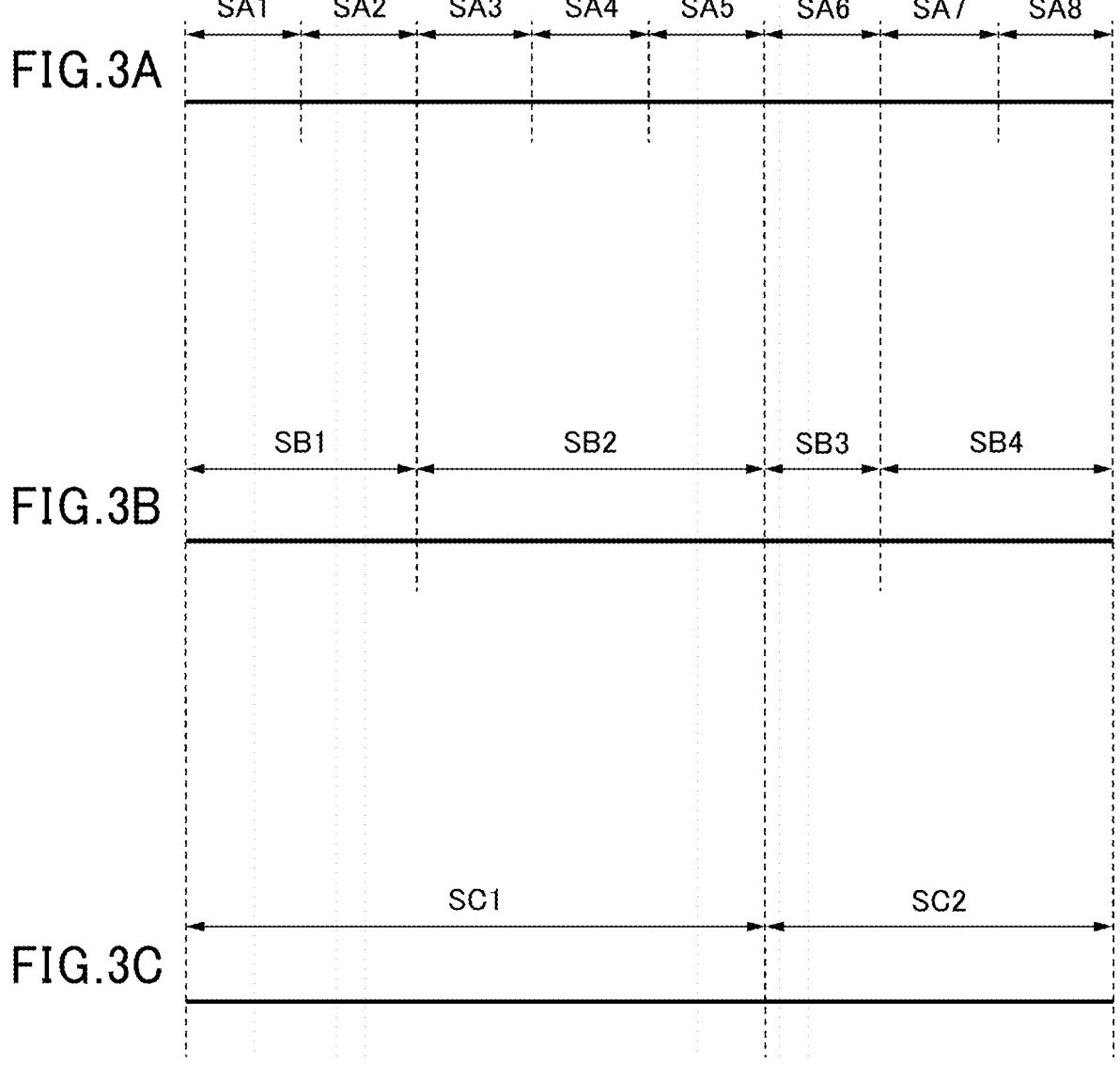
FIGS. 3A to 3C are illustrations of setting route sections.

As illustrated in FIG. 3A, the route setting unit 101 preliminarily divides the travel route and sets eight preliminary route sections SA1, SA2, SA3, SA4, SA5, SA6, SA7, and SA8. For the sake of illustration, in the present embodiment, all of the preliminary route sections SA1, SA2, SA3, SA4, SA5, SA6, SA7, and SA8 are of the same length. In an alternative embodiment, the preliminary route sections SA1, SA2, SA3, SA4, SA5, SA6, SA7, and SA8 may be of different lengths. The length of each preliminary route section is set arbitrarily. Although the eight preliminary route sections SA1, SA2, SA3, SA4, SA5, SA6, SA7, and SA8 are shown as an example, the number of preliminary route sections may be determined as appropriate as long as there are plural or three or more subject route sections.

The route setting unit 101 determines, for each pair of adjacent preliminary route sections, whether a merge condition is met. In the example illustrated in FIG. 3A, the route setting unit 101 determines whether the preliminary route section SA1 and the preliminary route section SA2 meet the merge condition. The route setting unit 101 determines whether the preliminary route section SA2 and the preliminary route section SA3 meet the merge condition. The route setting unit 101 determines whether the preliminary route section SA3 and the preliminary route section SA4 meet the merge condition. The route setting unit 101 determines whether the preliminary route section SA4 and the preliminary route section SA5 meet the merge condition. The route setting unit 101 determines whether the preliminary route section SA5 and the preliminary route section SA6 meet the merge condition. The route setting unit 101 determines whether the preliminary route section SA6 and the preliminary route section SA7 meet the merge condition. The route setting unit 101 determines whether the preliminary route section SA7 and the preliminary route section SA8 meet the merge condition. Details of the merge condition are described below.

In the example illustrated in FIG. 3A, the preliminary route sections SA1 and SA2 meet the merge condition. The preliminary route sections SA2 and SA3 do not meet the merge condition. The preliminary route sections SA3 and SA4 meet the merge condition. The preliminary route sections SA4 and SA5 meet the merge condition. The preliminary route sections SA5 and SA6 do not meet the merge condition. The preliminary route sections SA6 and SA7 do not meet the merge condition. The preliminary route sections SA7 and SA8 meet the merge condition.

As above, the route setting unit 101 merges each pair of preliminary route sections that meet the merge condition, resulting in the route sections as illustrated in FIG. 3B. Specifically, the route setting unit 101 merges the preliminary route section SA1 and the preliminary route section SA2 to set the route section SB1. The route setting unit 101 merges the preliminary route section SA3 and the preliminary route section SA4 and the preliminary route section SA5 to set the route section SB2. The route setting unit 101 sets the route section SB3 without merging the preliminary route section SA6 with any other preliminary route section. The route setting unit 101 merges the preliminary route section SA7 and the preliminary route section SA8 to set the route section SB4.

The process of the route setting unit 101 merging the preliminary route sections into route sections may be completed by merging the preliminary route sections SA1, SA2, SA3, SA4, SA5, SA6, SA7, and SA8 as illustrated in FIG. 3A based on the merge condition to set the route sections SB1, SB2, SB3, and SB4 as illustrated in FIG. 3B.

The route setting unit 101 may regard the route sections SB1, SB2, SB3, and SB4 as illustrated in FIG. 3B as preliminary route sections and further perform the process of merging them. In FIG. 3B, the route sections SB1 and SB2 regarded as preliminary route sections meet the merge condition. The route sections SB2 and SB3 regarded as preliminary route sections do not meet the merge condition. The route sections SB3 and SB4 regarded as preliminary route sections meet the merge condition.

The route setting unit 101 regards the route sections SB1, SB2, SB3, and SB4 as preliminary route sections and merges them in the similar manner as described above, resulting in the route sections as illustrated in FIG. 3C. Specifically, the route setting unit 101 merges the route sections SB1 and SB2 regarded as preliminary route sections, and sets the route section SC1. The route setting unit 101 merges the route sections SB3 and SB4 regarded as preliminary route sections, and sets the section route SC2.

The merge condition will now be described. The merge condition is determined based on condition information about the energy consumed when a vehicle travels a travel route. The condition information includes at least one of driving condition information, energy condition information, and road condition information. The merge condition is determined based on at least one of the driving condition information, the energy condition information, and the road condition information.

The route setting unit 101 divides the travel route into preliminary route sections and merges each pair of adjacent preliminary route sections into one route section based on whether the pair of adjacent preliminary route sections meet the merge condition. Since the merge condition is determined based on the condition information about the energy consumed when a vehicle travels the travel route, a determination as to whether to merge a pair of adjacent preliminary route sections is made based on whether the pair of adjacent preliminary route sections have the condition information similar enough for them to be merged.

Figure 4:
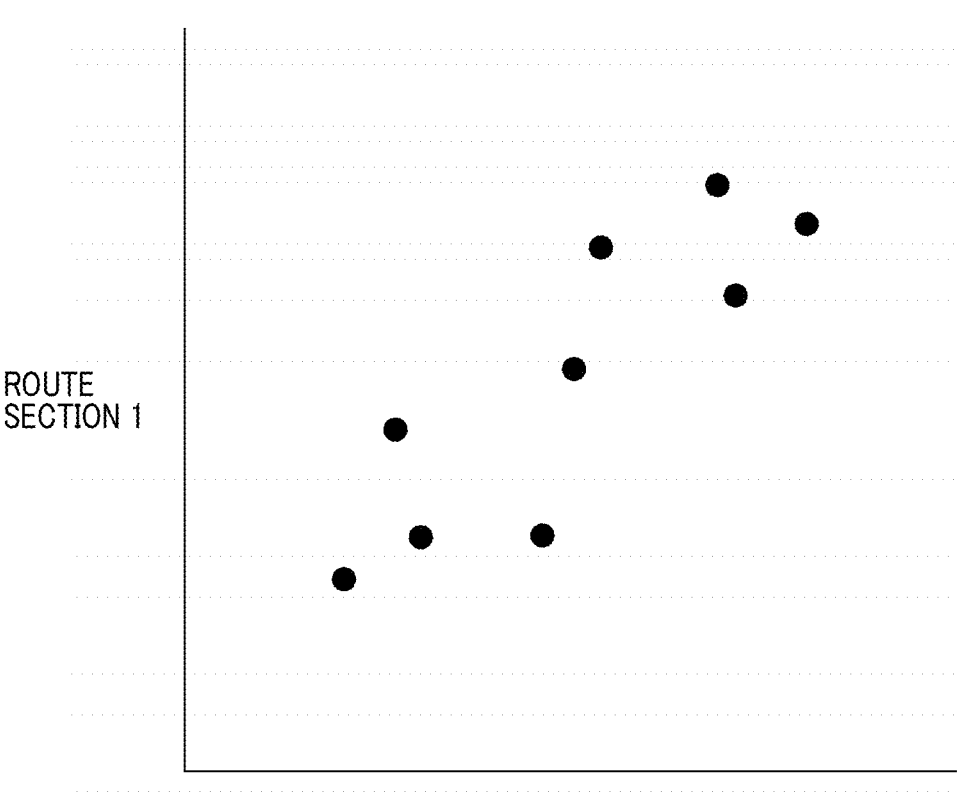
FIG. 4 is an illustration of setting route sections.

For example, a case where a determination as to whether the merge condition is met is made based on the number of stops per unit distance in the same run will now be described with reference to FIG. 4. In FIG. 4, the number of stops of the vehicle per unit distance is plotted for each of the route sections 1 and 2 when the vehicle travels the route sections 1 and 2 in the same run. Determining a correlation coefficient from FIG. 4 allows the route setting unit 101 to determine whether the merge condition is met. Instead of the correlation coefficient, a coefficient of a regression curve or a straight line may be used to determine whether the merge condition is met.

For example, a determination as to whether the merge condition is met may be made using correlation coefficients for the features of the driving condition. For example, a threshold value may be set for a plurality of correlation coefficients, and it may be determined that the merge condition is met when the plurality of correlation coefficients exceed the threshold value. The plurality of correlation coefficients may be arbitrarily weighted, and a determination as to whether the merge condition is met may be made based on the calculated values.

Another example of determining whether the merge condition is met will now be described with reference to FIG. 5. The example illustrated in FIG. 5 is an example of using cluster analysis to determine whether the merge condition is met. As illustrated in FIG. 5, the number of stops per unit distance is recorded for each of route sections 1, 2, 3, 4, and 5 for runs 1, 2, and 3. The route setting unit 101 uses a known cluster analysis method to determine, for example, whether the route sections 1 and 2 belong to the same cluster. If the route setting unit 101 determines that the route sections 1 and 2 belong to the same cluster, it determines that the merge condition is met and merges the route sections 1 and 2. If the route setting unit 101 determines that route sections 1 and 2 do not belong to the same cluster, it determines that the merge condition is not met and does not merge the route sections 1 and 2. The route setting unit 101 performs the same process for the other pairs of adjacent route sections.

Instead of clustering based on a single item of data as illustrated in FIG. 5, clustering may be performed using a plurality of representative metrics for each route section acquired through one or more runs.

In the example illustrated in FIG. 6, the plurality of representative metrics such as the number of stops, the average vehicle speed, and the average road grade are used. As in the manner described with reference to FIG. 5, the route setting unit 101 uses a known cluster analysis method to determine, for example, whether the route sections 1 and 2 belong to the same cluster. When the route setting unit 101 determines that the route sections 1 and 2 belong to the same cluster, it determines that the merge condition is met, and merges the route sections 1 and 2. When the route setting unit 101 determines that the route sections 1 and 2 do not belong to the same cluster, it determines that the merge condition is not met, and does not merge the route sections 1 and 2. The route setting unit 101 may use results from a plurality of clusterings to determine whether the merge condition is met.

Referring again to FIG. 2, the information processing flow by the energy prediction device 10 is continued to be described. Upon completion of the travel route dividing process at step S001, the process flow proceeds to step S002.

At step 002, the model construction unit 102 constructs consumption prediction models.

The model construction unit 102 constructs a consumption prediction model for each route section. In the example illustrated in FIG. 3B, the model construction unit 102 constructs a consumption prediction model for each of the route sections SB1, SB2, SB3, and SB4. In the example illustrated in FIG. 3C, the model construction unit 102 constructs a consumption prediction model for each of the route sections SC1 and SC2. The model construction unit 102 may construct a different consumption prediction model or the same consumption prediction model for each route section. The model construction unit 102 constructs an appropriate consumption prediction model according to a situation of each route section. The model construction unit 102 stores the constructed consumption prediction models in the information storage unit 110.

As an example of the consumption prediction model constructed by the model construction unit 102, there is a consumption prediction model for directly predicting the energy consumed. The explanatory variables for this consumption prediction model includes at least one of the weather information, road condition information, date-and-time information, and driver information acquired by the information acquisition unit 103.

The weather information includes at least one of a precipitation probability, a precipitation amount, and a temperature. The road condition information includes information indicating at least one of information about road grades, information about locations of bus stops, information about locations of intersections, information about road widths, information about speed limits, information about locations of traffic lights or signs, information about curvatures of curves, and information about congestion levels. The date-and-time information includes at least one of the time of day, the day of the week, national holidays, and the season. The driver information includes information indicating attributes of drivers and characteristics of drivers corresponding to their attributes.

The objective variable of the consumption prediction model is a variable related to the energy consumed. A quantity that correlates with an amount of energy consumed is used as the variable related to the energy consumed. Specifically, the variable related to the energy consumed may be, for example, the fuel cost, electricity cost, change in SOC, change in fuel consumption, or an integrated value of inverter current.

Figure 9:
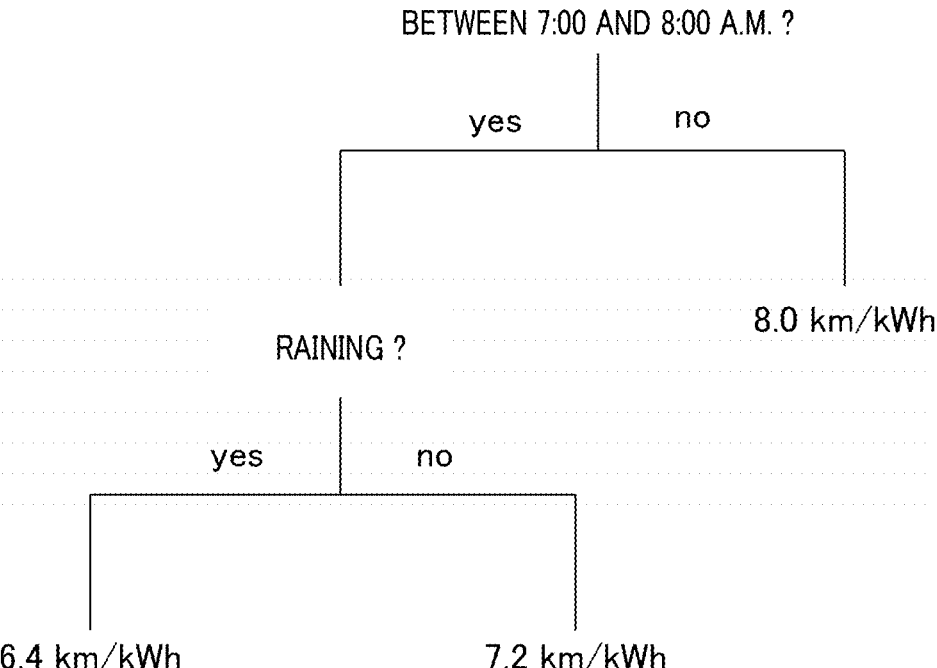
FIG. 9 is an illustration of energy prediction.

A modelling method for the consumption prediction model may be any regression method, such as linear regression, multiple regression, nonlinear regression, a generalized linear model, support vector regression, Gaussian process regression, an ensemble method, a decision tree, or a neural network. FIG. 9 illustrates an example using the decision tree. In the example illustrated in FIG. 9, the objective variable is the electricity cost, and the features used are a time slot and the presence or absence of precipitation.

Regarding the learning method for the consumption prediction model, an influence of each explanatory variable can be formulated by constructing a linear polynomial like the formula (f01), for example, by multi-regression analysis. In the formula (f01), Y is a variable correlated with the energy consumed, and $\beta n$ represents an influence of a respective explanatory variable Xn (n=0, 1, 2, . . . ).

$$Y = \beta_0 + \beta_1 X_1 + \beta_2 X_3 + \beta_3 X_3 + \beta_4 X_4 + \qquad \text{(f01)}$$

Any other machine learning method may be used as the learning method for the consumption prediction model. Any method other than the machine learning method may be used as the learning method for the consumption prediction model. For example, any formulation method may be used, such as adopting constant values according to information acquired by the information acquisition unit 103.

Another example of the consumption prediction model constructed by the model construction unit 102 is a consumption prediction model for predicting a vehicle speed waveform. In this case, the energy consumed may be calculated from the predicted vehicle speed waveform and a physical model that takes into account the vehicle weight, the energy efficiency of the drive train, and the running resistance, which are stored in the vehicle characteristics storage unit 201.

When the model construction unit 102 predicts the vehicle speed waveform, the explanatory variables include at least one of the weather information, road condition information, date-and-time information, and driver information acquired by the information acquisition unit 103.

The weather information includes at least one of a precipitation probability, a precipitation amount, and a temperature. The road condition information includes information indicating at least one of information about road grades, information about locations of bus stops, information about locations of intersections, information about road widths, information about speed limits, information about locations of traffic lights or signs, information about curvatures of curves, and information about congestion levels. The date-and-time information includes at least one of the time of day, the day of the week, national holidays, and the season. The driver information includes information indicating attributes of drivers and characteristics of drivers corresponding to their attributes.

Figure 7:
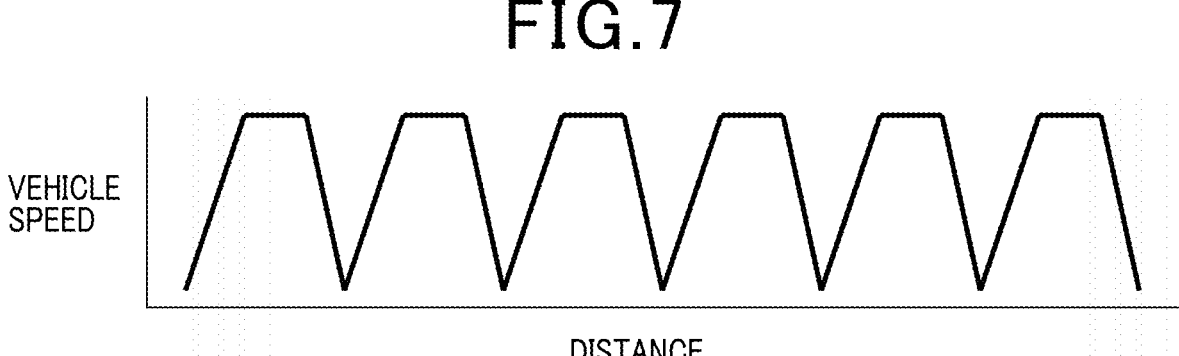
FIG. 7 is an illustration of energy prediction.

The objective variable of the consumption prediction model may be any metric related to the vehicle speed, such as the number of stops, average vehicle speed, steady-state vehicle speed (that is a vehicle speed during a time period from the end of acceleration to the start of deceleration) or the like. For example, the model construction unit 102 estimates the number of stops and the steady-state vehicle speed using different prediction models. As illustrated in FIG. 7, the model construction unit 102 creates a trapezoid-shaped vehicle speed pattern that reflects the estimated number of stops and the estimated steady-state vehicle speed. The model construction unit 102 sets the acceleration and deceleration based on the driver information and the characteristics information of vehicles in general. The model construction unit 102 arbitrarily sets intervals between stop locations to fall within a traveled distance per section.

Figure 10:
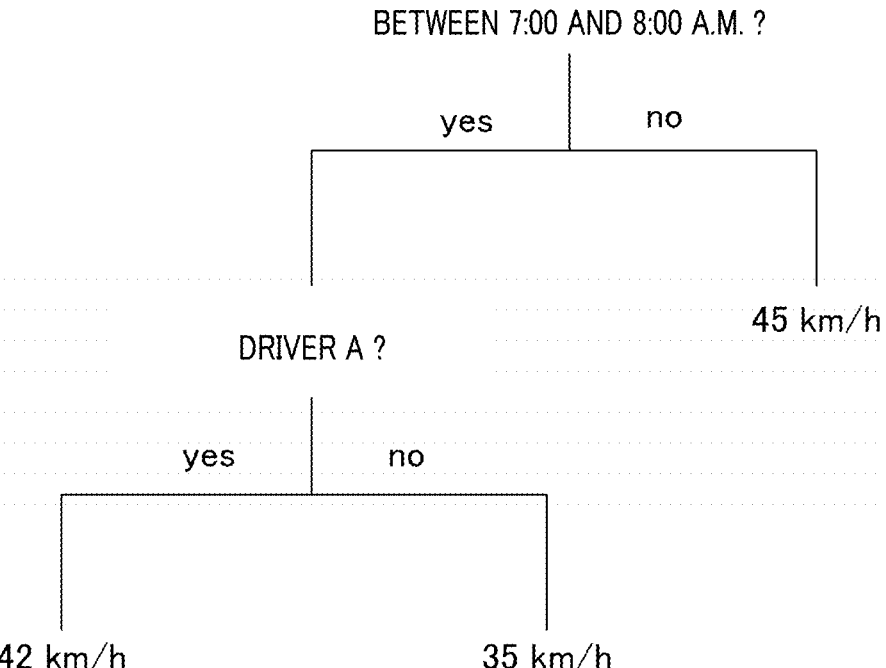
FIG. 10 is an illustration of energy prediction.

A modelling method for the consumption prediction model may be any regression method, such as linear regression, multiple regression, nonlinear regression, a generalized linear model, support vector regression, Gaussian process regression, an ensemble method, a decision tree, or a neural network. FIG. 10 illustrates an example using the decision tree. In the example illustrated in FIG. 10, the objective variable is the average vehicle speed and the features used are a time slot and driver information.

Figure 8A:
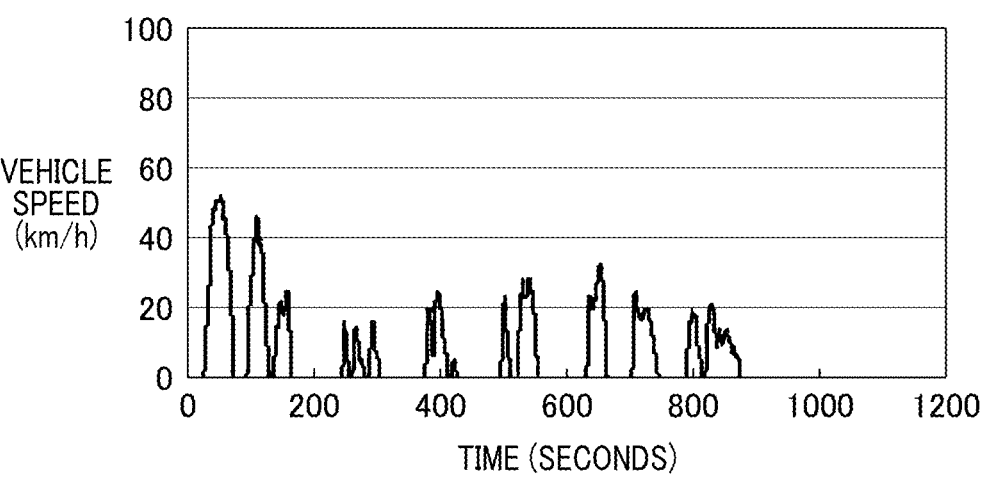
FIGS. 8A to 8C are illustrations of energy prediction.
Figure 8B:
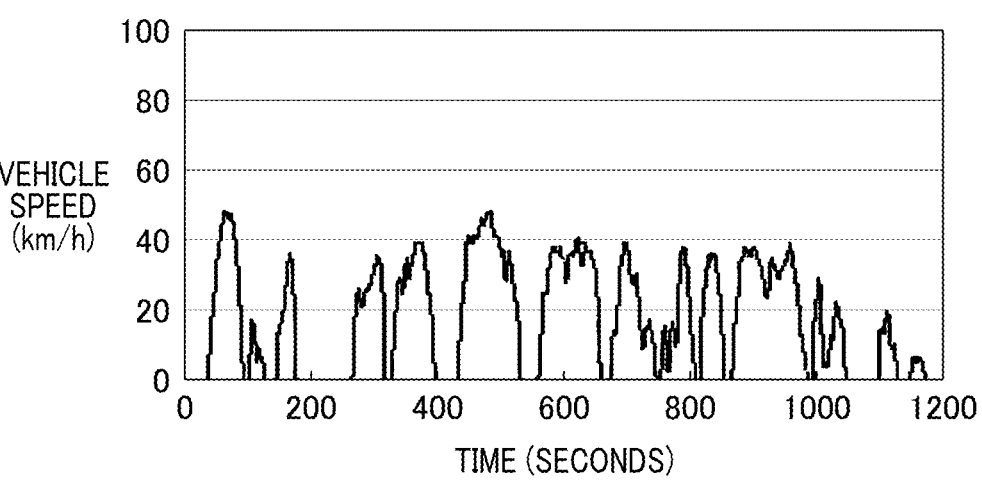
Figure 8C:
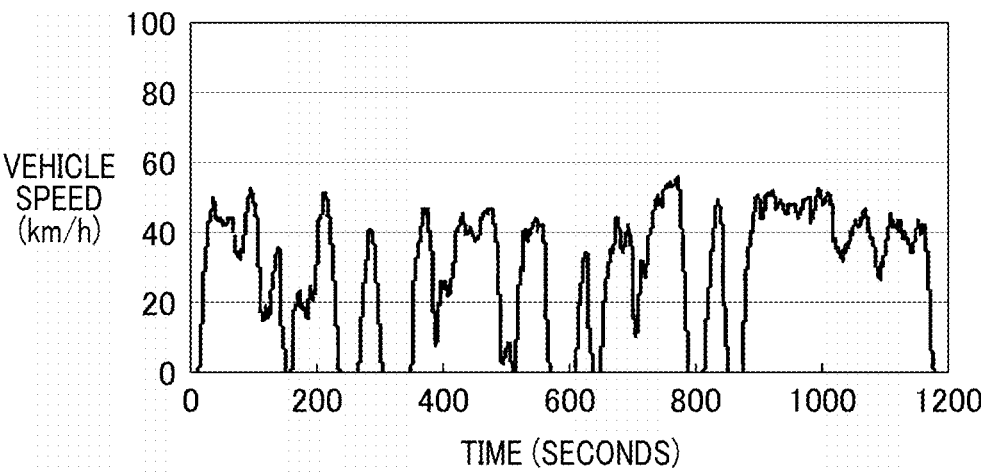

The model construction unit 102 may create a vehicle speed pattern by preparing in advance vehicle speed patterns corresponding to average vehicle speeds and selecting a vehicle speed pattern which conforms to the average vehicle speed. For example, for the average vehicle speed between 10 km/h and 15 km/h, the model construction unit 102 may select a vehicle speed pattern as illustrated in FIG. 8A. For the average vehicle speed between 15 km/h and 25 km/h, the model construction unit 102 may select a vehicle speed pattern as illustrated in FIG. 8B. For the average vehicle speed between 25 km/h and 35 km/h, the model construction unit 102 may select a vehicle speed pattern as illustrated in FIG. 8C. The model construction unit 102 may select a vehicle speed pattern based on a plurality of vehicle speed metrics, for example, the number of stops and the average vehicle speed.

The model construction unit 102 may prepare a plurality of vehicle speed patterns and directly estimate which vehicle speed pattern is to be employed from the explanatory variables, which are features, by means of a classification model. In the model construction unit 102 employing the classification model, the explanatory variables use at least one of the weather information, road condition information, date-and-time information, and driver information acquired by the information acquisition unit 103.

The weather information includes at least one of a precipitation probability, a precipitation amount, and a temperature. The road condition information includes information indicating at least one of information about road grades, locations of bus stops, information about locations of intersections, information about road widths, information about speed limits, information about locations of traffic lights or signs, information about curvatures of curves, and information about congestion levels. The date-and-time information includes at least one of the time of day, the day of the week, national holidays, and the season. The driver information includes information indicating attributes of drivers and characteristics of drivers corresponding to their attributes.

The objective variable of the consumption prediction model is a class of vehicle speed patterns, such as a suburban pattern, an urban pattern, and a congestion pattern. A modelling method for the consumption prediction model may be any one of a support vector machine, logistic regression, k-nearest neighbours, a neural network, Naive Bayes classifier, discriminant analysis, and a decision tree.

Upon completion of step S002, the process flow proceeds to step S003. At step S003, it is determined whether the energy prediction unit 104 directly predicts the energy consumed. If the energy prediction unit 104 directly predicts the energy consumed (on the YES branch at step S003), the process flow proceeds to step S004. If the energy prediction unit 104 does not directly predict the energy consumed (on the NO branch at step S003), the process flow proceeds to step S005.

At step S004, the energy prediction unit 104 predicts the energy consumed. The energy prediction unit 104 predicts the energy consumed for each route section using the consumption prediction model (see the formula (f01)) set for each route section. The energy prediction unit 104 may transform the objective variable into the energy consumed using any formula or map. The energy prediction unit 104 sums up the energy consumed that has been predicted for each route section and predicts the energy consumed for the entire travel route.

At step S005, the energy prediction unit 104 estimates the vehicle speed patterns. The energy prediction unit 104 estimates the vehicle speed patterns using the vehicle speed patterns created by the model construction unit 102 at step S002. If there is no special additional processing, the energy prediction unit 104 uses the vehicle speed patterns created by the model construction unit 102.

Upon completion of step S005, the process flow proceeds to step S006. At step S006, the energy prediction unit 104 predicts the energy consumed for each route section using the vehicle speed pattern V. The energy prediction unit 104 predicts the total energy consumed according to, for example, the following formula (f02).

$$\text{Total Energy Consumed} = \text{Vehicle Propulsion Energy} + \text{Air Conditioning Energy} + \text{Other Energy} \quad \text{(f02)}$$

The vehicle propulsion energy may be calculated by converting the travel resistance, which is calculated according to the following formula (f03), into energy.

$$\text{Travel Resistance} = \text{Acceleration Resistance} + \text{Air Resistance} + \text{Rolling Resistance} + \text{Road Grade Resistance} \quad \text{(f03)}$$

The acceleration resistance, air resistance, road grade resistance, and rolling resistance may be calculated as follows.

Acceleration Resistance: $Ma$

Air Resistance: $0.5\rho\lambda AV^2$

Road Grade Resistance: $Mg \cdot \sin\theta$

Rolling Resistance: $\mu \cdot Mg$, where

M: Vehicle Weight

A: Frontal Projected Area $\lambda$: Coefficient of Air Resistance $\mu$: Coefficient of Rolling Resistance $\theta$: Road Grade V: Vehicle Speed a: Acceleration $\rho$: Air Density g: Gravitational Acceleration For vehicles having a regenerative function, such as electric and hybrid vehicles, the regenerative energy may be determined to correlate with the magnitude of negative travel resistance due to deceleration. For air conditioning energy and other energy consumed by accessories, predetermined values or values depending on the weather or season, such as the air temperature, may be used.

APPENDIX

The following Clauses 1 through 7 may be combined arbitrarily as long as they are not technically contradictory.
Clause 1:

The energy prediction device 10 includes a route setting unit 101 configured to divide a travel route traveled by a vehicle and sets route sections into which the travel route is divided, and a model construction unit 102 configured to construct a consumption prediction model for predicting an energy consumed by the vehicle for each route section.

According to clause 1, a consumption prediction model is constructed for each of route sections into which the travel route is divided, which allows the consumption prediction model to be constructed so as to better match the route section.
Clause 2:

In the energy prediction device 10 according to clause 2, the information acquisition unit 103 is further provided, which is configured to acquire condition information about the energy consumed when the vehicle travels the travel route. The route setting unit 101 is configured to divide the travel route and sets route sections into which the travel route is divided, based on proximity of the condition information.

According to clause 2, the route sections are set based on the proximity of the condition information. For example, the route sections where the condition information is not similar and various situations are mixed in the travel route, may be set finer, which increases the accuracy of the consumption prediction models. In addition, for example, if there are two or more consecutive route sections with similar condition information along the travel route, it is possible to set a longer route section by merging the two or more consecutive route sections on the travel route and share the consumption prediction model, which reduces the computational load.

Clause 3:

In the energy prediction device 10 according to clause 2, the route setting unit 101 is configured to set a plurality of preliminary route sections by preliminarily dividing the travel route, determine, for each pair of adjacent preliminary route sections, whether a merge condition is met based on the proximity of condition information between the pair of adjacent preliminary route sections, and set the route sections through a process of merging a respective pair of preliminary adjacent route sections that meet the merge condition.

According to clause 3, the merging process is performed by determining whether the merge condition is met, based on the proximity in condition information of the preliminary route sections. This facilitates setting of route sections that reflect the proximity. Since it is only necessary to perform the process of merging preliminary route sections that meet the merge condition, making a determination as to whether the merge condition is met may be continued by treating the route sections merged with each other as a preliminary route section.

Clause 4:

In the energy prediction device 10 according to clause 2, the condition information includes at least one of driving condition information for identifying a driving condition in which the vehicle travels the travel route, energy condition information for identifying energy required for the vehicle to travel the travel route, and road condition information for identifying a road condition that is a condition of the travel route that affects the energy required for the vehicle to travel the travel route. The route setting unit 101 is configured to set the route sections based on the proximity of the at least one of the driving condition information, the energy condition information, and the road condition information.

According to clause 4, the route sections are set based on the proximity of the at least one of the driving condition information, the energy condition information, and the road condition information. This allows the route sections to be set to reflect multiple aspects of the travel route.

Clause 5:

In the energy prediction device 10 according to clause 1, the model construction unit 102 is configured to construct the consumption prediction model as a learning model with explanatory variables and an objective variable, where the explanatory variables include at least one of weather information, a road condition, time information, and driver information, and the objective variable includes at least one of a metric for each vehicle speed pattern and a metric for energy consumed.

Clause 6:

In the energy prediction device 10 according to clause 1, the energy prediction unit 104 is further provided, which is configured to predict the energy consumed for each route section using the consumption prediction model constructed for each route section and predicts the energy consumed on the travel route.

Clause 7:

In the energy prediction device 10 according to clause 5, the energy prediction unit 104 is further provided, which is configured to, in a case where the objective variable is the metric for each vehicle speed pattern, predict for each route section the energy consumed based on the vehicle speed pattern that is created for the route section based on the metric for each vehicle speed pattern, and predict the energy consumed on the travel route.

The energy prediction device 10 and the method thereof described in the present disclosure may be realized by a dedicated computer provided by configuring a processor and memory programmed to perform one or more functions embodied in a computer program. Alternatively, the energy prediction device 10 and the method thereof described in the present disclosure may be realized by a dedicated computer provided by configuring a processor with one or more dedicated hardware logic circuits. Alternatively, the energy prediction device 10 and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

The present embodiment is thus far described with reference to specific examples. However, the present invention is not limited to these specific examples. Modifications resulting from appropriate design changes applied by those skilled in the art to these specific examples are also included in the scope of the present disclosure as long as the modifications have the features of the present disclosure. The elements, the arrangement of the elements, the conditions, the shapes, and the like of each of the above-described specific examples are not necessarily limited to those exemplified and can be appropriately changed. A combination of the respective elements included in each of the above-described specific examples can be appropriately changed as long as no technical inconsistency exists.

What is claimed is:

1. An energy prediction device comprising:

a route setting unit configured to divide a travel route traveled by a vehicle and sets route sections into which the travel route is divided; and a model construction unit configured to construct a consumption prediction model for predicting an energy consumed by the vehicle for each route section, and an information acquisition unit configured to acquire condition information about the energy consumed when the vehicle travels the travel route, wherein the route setting unit is configured to divide the travel route and set route sections into which the travel route is divided, based on proximity of the condition information.

2. The energy prediction device according to claim 1, wherein the route setting unit is configured to set a plurality of preliminary route sections by preliminarily dividing the travel route, determine, for each pair of adjacent preliminary route sections, whether a merge condition is met based on the proximity of condition information between the pair of adjacent preliminary route sections, and set the route sections through a process of merging a respective pair of preliminary adjacent route sections that meet the merge condition.

3. The energy prediction device according to claim 1, wherein the condition information includes at least one of driving condition information for identifying a driving condition in which the vehicle travels the travel route, energy condition information for identifying energy required for the vehicle to travel the travel route, and road condition information for identifying a road condition that is a condition of the travel route that affects the energy required for the vehicle to travel the travel route, and the route setting unit is configured to set the route sections based on the proximity of the at least one of the driving condition information, the energy condition information, and the road condition information.

4. An energy prediction device comprising:

a route setting unit configured to divide a travel route traveled by a vehicle and sets route sections into which the travel route is divided; and a model construction unit configured to construct a consumption prediction model for predicting an energy consumed by the vehicle for each route section, the model construction unit is configured to construct the consumption prediction model as a learning model with explanatory variables and an objective variable, the explanatory variables include at least one of weather information, a road condition, time information, and driver information, and the objective variable includes at least one of a metric for each vehicle speed pattern and a metric for energy consumed.

5. The energy prediction device according to claim 1, further comprising an energy prediction unit configured to predict the energy consumed for each route section using the consumption prediction model constructed for each route section and predicts the energy consumed on the travel route.

6. The energy prediction device according to claim 4, further comprising an energy prediction unit configured to, in a case where the objective variable is the metric for each vehicle speed pattern, predict for each route section the energy consumed based on the vehicle speed pattern that is created for the route section based on the metric for each vehicle speed pattern, and predict the energy consumed on the travel route.

7. An energy prediction method comprising:

dividing a travel route traveled by a vehicle and sets route sections into which the travel route is divided; and constructing a consumption prediction model for predicting an energy consumed by the vehicle for each route section, and acquiring condition information about the energy consumed when the vehicle travels the travel route, wherein the travel route is divided and the route sections are set based on the proximity of condition information.

8. A non-transitory computer readable medium having stored thereon instructions executable by a computer to cause the computer to perform an energy prediction method, comprising:

dividing a travel route traveled by a vehicle and sets route sections into which the travel route is divided; and constructing a consumption prediction model for predicting an energy consumed by the vehicle for each route section, and acquiring condition information about the energy consumed when the vehicle travels the travel route, wherein the travel route is divided and the route sections are set based on the proximity of condition information.

9. The energy prediction device according to claim 4, further comprising an energy prediction unit configured to predict the energy consumed for each route section using the consumption prediction model constructed for each route section and predicts the energy consumed on the travel route.

10. An energy prediction method comprising:

dividing a travel route traveled by a vehicle and sets route sections into which the travel route is divided; and constructing a consumption prediction model for predicting an energy consumed by the vehicle for each route section, wherein the consumption prediction model is constructed as a learning model with explanatory variables and an objective variable, the explanatory variables include at least one of weather information, a road condition, time information, and driver information, and the objective variable includes at least one of a metric for each vehicle speed pattern and a metric for energy consumed.

11. A non-transitory computer readable storage medium having stored thereon instructions executable by a computer to cause the computer to perform an energy prediction method, comprising:

dividing a travel route traveled by a vehicle and sets route sections into which the travel route is divided; and constructing a consumption prediction model for predicting an energy consumed by the vehicle for each route section, wherein the consumption prediction model is constructed as a learning model with explanatory variables and an objective variable, the explanatory variables include at least one of weather information, a road condition, time information, and driver information, and the objective variable includes at least one of a metric for each vehicle speed pattern and a metric for energy consumed.

* * * * *